(12) United States Patent
Sachs et al.

(10) Patent No.: US 9,180,827 B2
(45) Date of Patent: Nov. 10, 2015

(54) CONNECTING PART FOR CONNECTING A BUMPER COVERING ON A VEHICLE BODY, VEHICLE BODY AS WELL AS METHOD FOR ASSEMBLING A BUMPER COVERING ON A VEHICLE BODY

(71) Applicant: GM Global Technology Operations LLC, Detroit, MI (US)

(72) Inventors: Martin Leonhard Sachs, Roedermark (DE); Theobald Hock, Grossostheim (DE); Rolf Ewert, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 13/780,799

(22) Filed: Feb. 28, 2013

(65) Prior Publication Data
US 2013/0234457 A1 Sep. 12, 2013

(30) Foreign Application Priority Data
Mar. 8, 2012 (DE) .......................... 10 2012 004 814

(51) Int. Cl.
*B60R 19/24* (2006.01)
(52) U.S. Cl.
CPC ........... *B60R 19/24* (2013.01); *B60R 2019/247* (2013.01)
(58) Field of Classification Search
CPC .............. B60R 19/24; B60R 2019/247; B60R 2019/245
USPC ......... 293/120–123, 132, 134, 154, 155, 141, 293/117; 296/193.08, 193.05, 187.09, 29; 29/198
See application file for complete search history.

(56) References Cited

U.S. PATENT DOCUMENTS

| 6,233,792 | B1 | 5/2001 | Kanie |
| 7,625,021 | B2 * | 12/2009 | Naik et al. ................... 293/120 |
| 2007/0096482 | A1 | 5/2007 | Matsui et al. |
| 2010/0187841 | A1 * | 7/2010 | Sano ............................. 293/155 |
| 2011/0080012 | A1 * | 4/2011 | Ruder .......................... 293/142 |
| 2012/0043771 | A1 | 2/2012 | Sachs et al. |

FOREIGN PATENT DOCUMENTS

| DE | 19736755 A1 | 2/1999 |
| DE | 10242172 A1 | 3/2004 |

(Continued)

OTHER PUBLICATIONS

German Patent Office, German Search Report for Application No. 10 2012 004 814.9 dated Nov. 12, 2012.

(Continued)

*Primary Examiner* — Pinel Romain
(74) *Attorney, Agent, or Firm* — Ingrassia Fisher & Lorenz PC

(57) ABSTRACT

A connecting part for connecting a bumper covering to a vehicle body is provided. The connecting part is fastenable to the vehicle body and serves as holder for the bumper covering. The connecting part includes a bearing portion that is at least partially brought to bear against a counterpart portion of the vehicle body. The connecting part also includes holding means by which, prior to fastening of the connecting part to the vehicle body, the connecting part is brought into a holding position on the vehicle body subject to the bearing portion bearing against the counterpart portion.

17 Claims, 6 Drawing Sheets

(56) References Cited

FOREIGN PATENT DOCUMENTS

| | | |
|---|---|---|
| DE | 102009057177 A1 | 6/2011 |
| JP | 2002362265 A | 12/2002 |

OTHER PUBLICATIONS

UKIPO, British Search Report for Application No: 1303073.9, Jul. 12, 2013.

* cited by examiner

CONNECTING PART FOR CONNECTING A BUMPER COVERING ON A VEHICLE BODY, VEHICLE BODY AS WELL AS METHOD FOR ASSEMBLING A BUMPER COVERING ON A VEHICLE BODY

CROSS-REFERENCE TO RELATED APPLICATION

This application claims priority to German Patent Application No. 10 2012 004 814.9, filed Mar. 8, 2012, which is incorporated herein by reference in its entirety.

TECHNICAL FIELD

The technical field relates to a connecting part for connecting a bumper covering to a vehicle body. The connecting part can be fastened to the vehicle body and serves as holder for the bumper covering. The connecting part includes at least one bearing portion, which at least partially can be brought to bear against a counterpart portion of the vehicle body. The technical field furthermore relates to a vehicle body, in particular a side wall or fender of a motor vehicle, to which such a connecting part can be fastened. The vehicle body comprises a portion against which the at least one bearing portion of the connecting part can be brought to bear. Furthermore, the technical field relates to a method for assembling a bumper covering on a vehicle body. The technical field also relates to a system for fastening a bumper covering to a vehicle body.

BACKGROUND

A bumper covering is usually attached to a motor vehicle body, in particular to the side wall or to the fender of a motor vehicle, by fastening a connecting part to the vehicle body and fixing the bumper covering to the connecting part. Such a fastening of the bumper covering to the vehicle body is usually performed both in the case of the bumper covering for the vehicle rear as well as for the bumper covering for the vehicle front.

The vehicle body is usually formed inwardly in the region of the bumper covering, so that the bumper covering is located at least partially lowered with respect to the outside of the vehicle body and thus a largely integrated bumper covering in the appearance of the outer front of the vehicle is achieved. By reshaping the vehicle body in the region of the bumper covering, a bending edge is usually created which is located on the outside of the vehicle body and is thus visible from the outside.

The bumper covering is usually fastened to the vehicle body in the manner that the distance of the outside of the bumper covering to the bending edge on the vehicle body is as small as possible, so that only a preferably small joint is formed. Therefore, in fastening the connecting part to the vehicle body, attempts are usually made to bring the connecting part with its bearing portion to bear against the wall portion of the reshaped vehicle body following the bending edge and facing to the inside.

However, it has been shown that when fastening the connecting part the aspired position of the connecting part relative to the vehicle body frequently is frequently difficult to maintain satisfactorily. It has also been shown that depending on the assembler the position of the connecting part on the vehicle body varies. All this makes it difficult to maintain the predetermined tolerance for the joint between the bending edge on the vehicle body and the bumper covering.

It is therefore at least one object herein to provide a position-accurate fastening of the bumper covering on the vehicle body. In addition, other objects, desirable features and characteristics will become apparent from the subsequent summary and detailed description, and the appended claims, taken in conjunction with the accompanying drawings and this background.

SUMMARY

A connecting part for connecting a bumper covering to a vehicle body, in particular to a side wall or a fender of a vehicle, as provided herein can be fastened to a vehicle body and serves as holder for the bumper covering. In an exemplary embodiment, such a connecting part, which can be designed as guide rail, has at least one bearing portion, which at least partially can be brought to bear against a counterpart portion of the vehicle body. The bearing portion can comprise a bearing surface or a bearing edge, wherein a bearing surface or bearing edge can likewise serve as a part portion of the vehicle body.

According to an embodiment, the connecting part comprises holding means by which prior to the fastening of the connecting part to the vehicle body the connecting part can be brought into a holding position on the vehicle body subject to the bearing portion bearing against the counterpart portion.

Through this measure, the connecting part can be exactly fastened to the vehicle body in the predetermined position, namely the holding position. Because of the fact that the connecting part is held in the holding position by the holding means a following fastening of the connecting part to the vehicle body in the predetermined position is possible without problem so that an undesired variability of the installation position of the connecting part on the vehicle body is avoided. Through the connecting part provided herein, even minute dimensional tolerances can be reliably maintained or achieved precisely during the assembly of a bumper covering to the vehicle body.

By way of the connecting part contemplated herein, highest tolerance requirements with respect to any joints formed by the bumper covering and the vehicle body are maintained. In addition, the bumper covering can be exactly and worker-independently fastened to the vehicle body in the predetermined position so that in the case of any joints forming between the vehicle body and the bumper covering a variability in the joint dimension caused by the assembler is avoided.

According to an embodiment the bearing portion serves as spacer for the connecting part with respect to the vehicle body. Because of this it is ensured that the connecting part is located in the holding position at the predetermined distance with respect to the side wall. A subsequent position alignment of the connecting part in the direction of the counterpart surface of the vehicle body is therefore not necessary.

In an embodiment, the bearing portion is substantially formed movably with respect to the base body of the connecting part.

According to a further embodiment, a spring element is provided, through the force of which, in particular a preload force, the connecting part in the holding position is pressed against the counterpart portion of the vehicle body with its bearing portion. Because of this, the connecting part is held on the vehicle body even in the case of active external forces, in which position the bearing portion of the connecting part bears against the counterpart portion of the vehicle body. Through the force of the spring element it is thus ensured that the connecting part is actually fastened to the vehicle body in the predetermined position, namely the holding position.

In another embodiment, a spring element is formed through a spring-elastic material portion of the connecting part, on which the holding means are arranged. Because of this, the spring element and the connecting part are realized in a particularly compact construction unit.

For example, the holding means and the spring-elastic material portion can therefore be arranged in the interior region of a side of the connecting part, for example, molded onto the connecting part there.

According to a further embodiment, an additional spring element is also provided. The additional spring element is formed by a strap projecting outwardly from the connecting part, in order to press against the counterpart portion of the vehicle body. Through the spring-elastic configuration of the strap the additional spring element is formed with little technical effort.

In an embodiment, the force of the additional spring element with respect to the force of the spring element differs such that at least in the holding position the bearing portion bears against, for example remains bearing against, the counterpart portion of the vehicle body. Because of this it is ensured that the connecting part on the vehicle body remains in the holding position, in which the connecting part is then fixed or fastened to the vehicle body.

According to a further embodiment, the holding means in the holding position permits a limited movability of the connecting part relative to the vehicle body in at least one direction. Because of this, a position change or position adjustment of the connecting part relative to the vehicle body is possible even in the holding position when the bearing portion of the connecting part has already come to bear against the counterpart portion of the vehicle body. The connecting part then still can be shifted at least slightly to a limited extent in a longitudinal direction and/or transversely to the longitudinal direction of the counterpart portion of the vehicle body while maintaining the bearing contact with the vehicle body.

In an embodiment, the connecting part is formed in an oblong manner and the bearing portion is arranged or formed on its longitudinal side. Because of this, a particularly position-secure connection of the connecting part to the vehicle body is realized. Through the oblong configuration of the connecting part a relatively large connecting area for fixing the bumper covering to the connecting part is additionally present on the longitudinal side, as a result of which a particularly durable connection of the bumper covering to the connecting part is achieved.

In another embodiment, the holding means are provided at least in duplicate and are substantially arranged spaced in longitudinal direction of the connecting part. Because of this, a fastening of the connecting part in the holding body to the vehicle body in the holding position is securely ensured.

According to a further embodiment, the holding means are formed through an opening, in particular a passage opening, in which a protrusion of the vehicle body can engage. In this way, the holding means are realized in a particularly simple manner.

In an embodiment, the opening and the protrusion should be formed corresponding to each other so that the protrusion can be inserted into the opening and in the inserted position the bearing portion of the connecting part bears against the counterpart portion of the vehicle body.

In an embodiment, the connecting part is a plastic part. Because of this, the connecting part can be produced in a technically simple and cost-effective manner. Because of this, the connecting part is also relatively light in terms of weight.

In another embodiment, the connecting part is an injected molded part. Because of this, relatively complex geometrical structures of the connecting part can also be realized in a technically simple manner.

According to a further embodiment, the connecting part comprises at least one passage opening for receiving a connecting element, in order to fasten the connecting part to the vehicle body by the connecting element. Because of this, the connecting part can be fastened to the vehicle body in a technically simple manner, for example by a screw element or of a rivet element.

According to a further embodiment, a vehicle body, for example, a side wall or fender of a motor vehicle, to which a connecting part of the type described above can be fastened, is provided. The vehicle body has a portion or counterpart portion against which the bearing portion of the connecting part can be brought to bear.

According to an embodiment, the vehicle body comprises means that can be brought into active connection with the holding means of the connecting part in order to bring the connecting part into a holding position subject to the bearing portion bearing against the portion or counterpart portion prior to fastening the connecting part to the vehicle body.

Because of this, the bumper covering can be fastened in the predetermined position, namely the holding position, exactly and worker-independently. In the case of any joints that may form between the vehicle body and the bumper covering, a variability in the joint dimension caused by the assembler is avoided in this way.

According to an embodiment, the means are formed through a protrusion projecting to the outside, which is formed for engaging in the holding means formed as an opening. Because of this, the means are realized in a technically particularly simple manner, which together with the holding means of the connecting part formed as an opening form a holding connection of connecting means and vehicle body in order to bring and hold the connecting part in the predetermined position with respect to the vehicle body, for example, until the fastening connection between the connecting part and the vehicle body has been created.

The protrusion for example can be a bolt, such as a welding bolt, which is arranged on the vehicle body, for example, welded thereon. The protrusion can also be molded out on the vehicle body.

In order to be able to realize the fastening connection between the connecting part and the vehicle body, the vehicle body comprises a passage opening for receiving a connecting element according to an embodiment. Because of this, the connecting part can be fastened to the vehicle body by the connecting element.

In another embodiment, the counterpart portion or portion of the vehicle body that can be brought into an active position with the bearing portion of the connecting part is an oblong wall portion, whose extension transversely to the longitudinal direction of the wall portion is limited by a bending edge in each case. Because of this, a relatively large bearing area is created, against which the bearing portion of the connecting part can bear, so that a particularly stable connection of connecting part and vehicle body is achieved. Through the bending edge on the vehicle body, a visually attractive transition from the bumper covering to the vehicle body is additionally made possible, if required subject to forming a joint in the transition region from the bumper covering to the vehicle body.

Furthermore, in accordance with an exemplary embodiment, a method for assembling a bumper covering to a vehicle body, for example, a vehicle body of the type described above, is provided.

With the method contemplated herein, a connecting part of the type described above is brought into a holding position on the vehicle body subject to the bearing portion of the connecting part bearing against the counterpart portion of the vehicle body, in that the holding means of the connecting part assume an active position with respect to the vehicle body, after which in the holding position the connecting part is fastened to the vehicle body by a fixing means, wherein in turn a bumper covering is subsequently fastened to the connecting part.

Because of this, the bumper covering can be fastened exactly and worker-independently to the vehicle body in the predetermined position, namely the holding position. With respect to any joints that may form between the vehicle body and the bumper covering, a variability in the joint dimension caused by the assembler is thus avoided.

Because of the fixing means, a shifting of the bearing portion of the connecting part away from the bearing position on the counterpart portion of the vehicle body is no longer possible. Connecting part and vehicle body are immovably connected to each other by the fixing element.

Furthermore, in accordance with an exemplary embodiment, a system for fastening a bumper covering to a vehicle body with a connecting part of the type described above, which is fastened to a vehicle body of the type described above, for example by a method of the type described above and a bumper covering being fixed thereon is provided.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Figure 1:
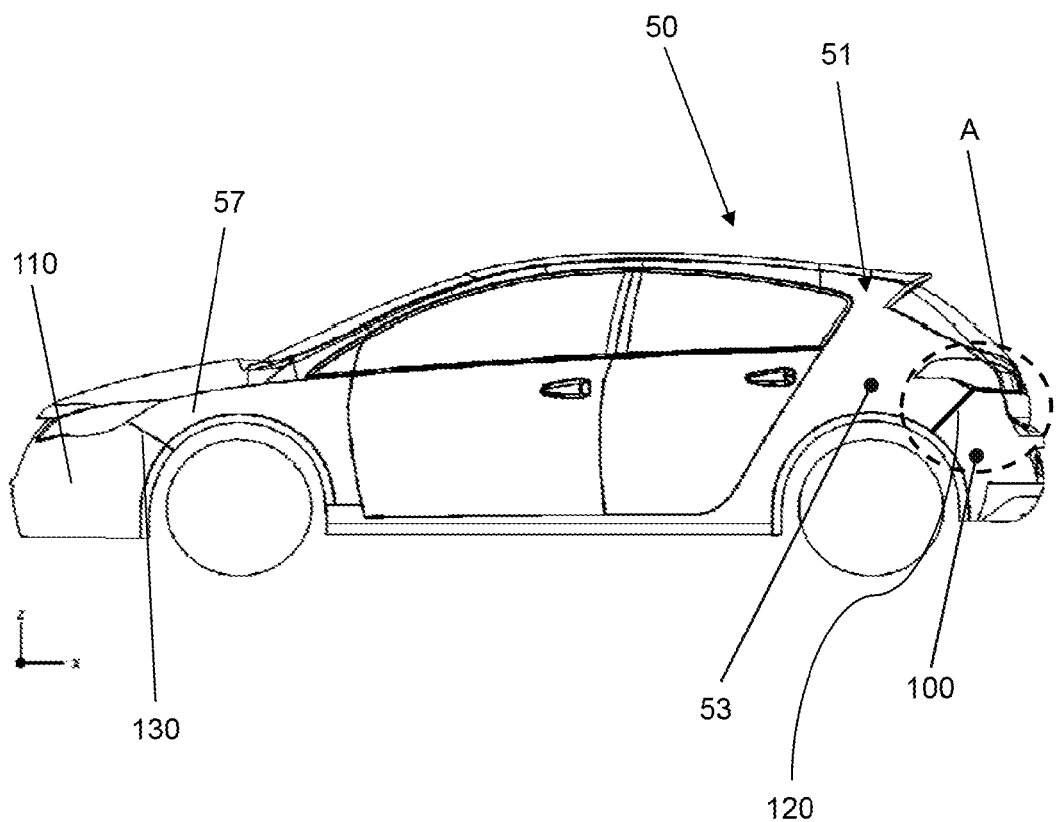
FIG. 1 is a motor vehicle in lateral view, wherein through a joint is formed a rear bumper covering with respect to a rear side wall and a front bumper covering with respect to a fender in each case at the transition from the bumper covering to the side wall or the fender in accordance with an exemplary embodiment.

In schematic representation, FIG. 1 exemplarily shows a motor vehicle 50 in lateral view. The motor vehicle 50 comprises a bumper covering 100 at its rear, which extends on the vehicle body 51 of the motor vehicle 50 as far as to the respective rear side wall 53 of the motor vehicle 50. The motor vehicle 50 furthermore comprises a bumper covering 110 in the front region, which extends as far as to the respective lateral fender 57 of the motor vehicle.

At the transition of the rear bumper covering 100 to the respective rear side wall 53, as well as at the transition of the front bumper covering 110 to the respective bumper 57, a joint 120 and 130 respectively is visible from the outside. Each of the joints 120 and 130 respectively is to be as small as possible in its dimension and, at least in the region that is visible from the outside, have a dimension that remains the same over the course, for example, the same width. In order to achieve this, the requirements made on the assembly tolerance when assembling the bumper covering 100 and 110 respectively to the vehicle body 51 are particularly high, i.e., merely smallest tolerances are permitted in the assembly of the bumper covering 100 and 110 respectively to the vehicle body 51. These high quality requirements of the joints 120 and 130 respectively can be achieved easily and without problems as described herein with respect to the example of the rear bumper covering 100 and its fastening to the side wall 53 and with respect to the front bumper covering 110 and its fastening to for example the fender 57.

Figure 2:
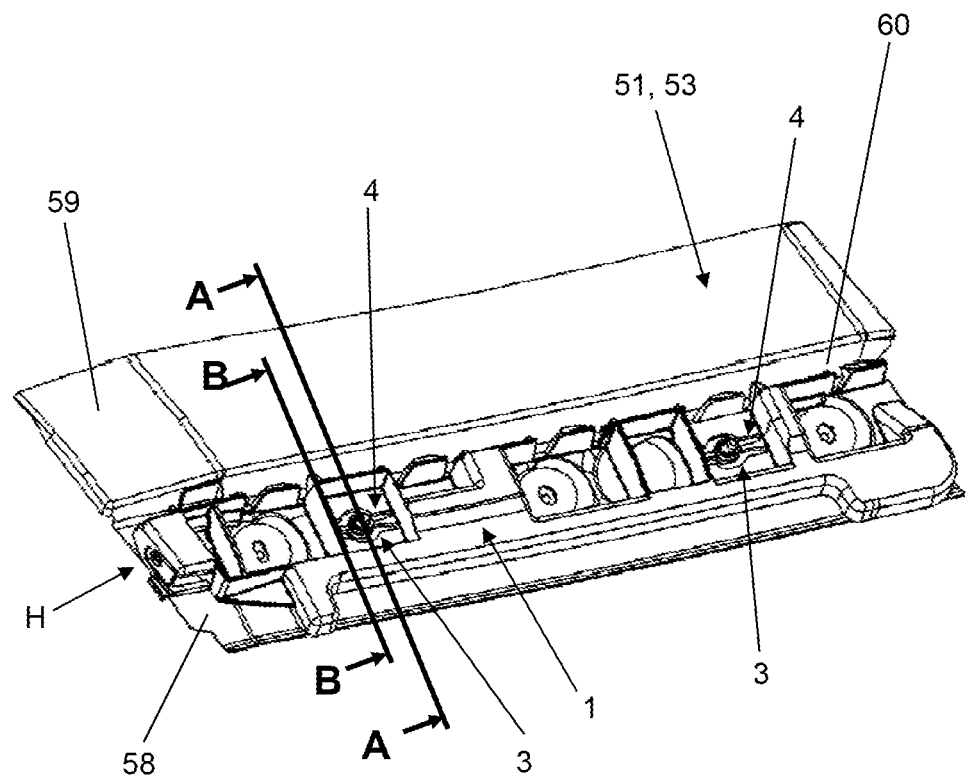
FIG. 2 is a closeup, perspective view of the region A of FIG. 1 showing the vehicle body of the motor vehicle in the connecting region with the bumper covering, on the example of the side wall of the motor vehicle, wherein the bumper covering has been omitted and a connecting part for connecting the bumper covering to the vehicle body is visible, in accordance with an exemplary embodiment.

FIG. 2 shows the side wall 53 of the vehicle body 51 in the region marked A in FIG. 1, wherein in the FIG. 2 the bumper covering 100 has been omitted for better understanding.

Figure 3:
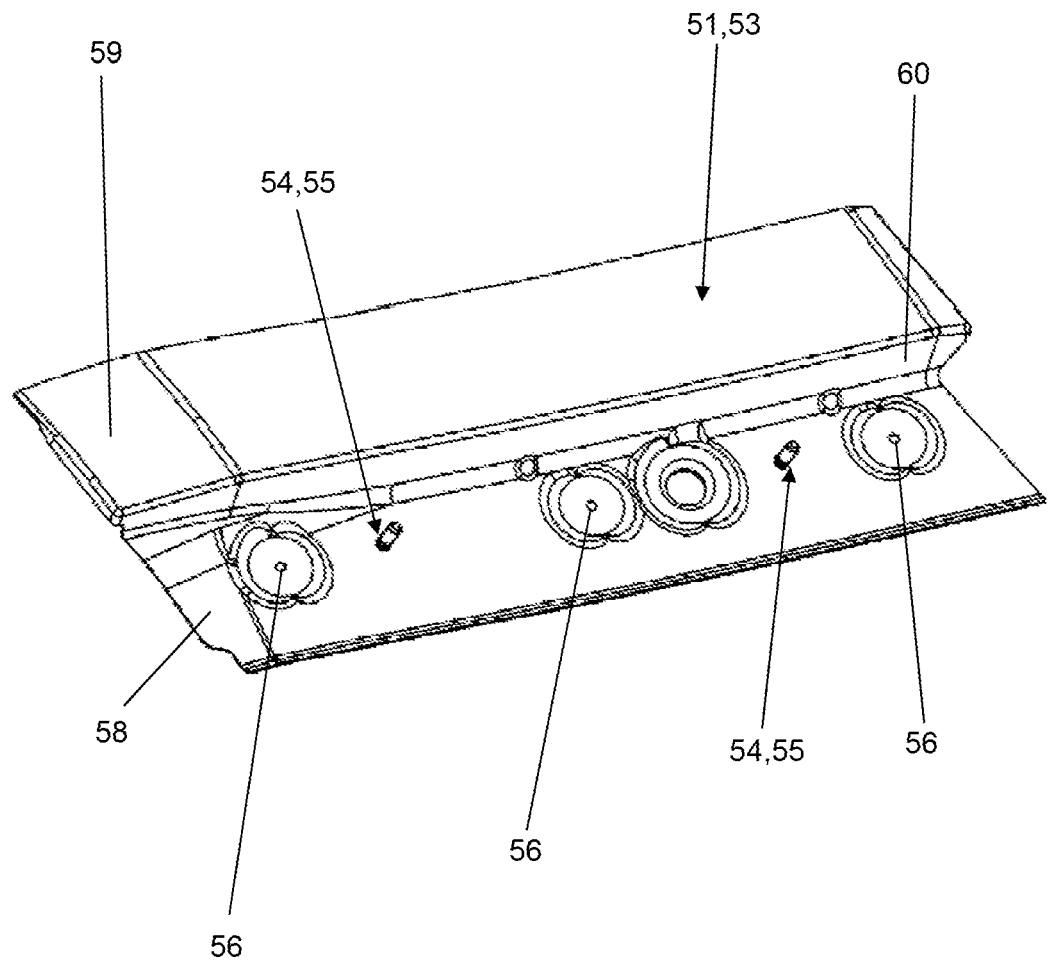
FIG. 3 is a perspective view of the region of the vehicle body according to FIG. 2 without the connecting part.

As is evident in particular from FIG. 2 and from FIG. 3, the side wall 53 is formed offset in the region of the connection to the bumper covering 100, in that the side wall 53 comprises a wall portion 58, which with respect to a wall portion 59 facing outward is shifted, for example substantially shifted in parallel, and a wall portion 60 is located in-between, which is arranged at an angle to the adjacent wall portions 58 and 59. In an embodiment, the wall portion 60 is formed in an oblong manner, on the longitudinal sides of which the wall portions 58 and 59 follow. In another embodiment, the wall portions 58, 59 and 60 are formed by forming the side wall 53. In a further embodiment, the longitudinal sides of the wall portion 60 substantially run at the same distance from one another.

As is additionally evident from FIG. 2, a connecting part 1 is arranged on the side wall 53. The connecting part 1 serves for connecting the bumper covering 100 (not shown in FIG. 2) to the vehicle body 51 or the side wall 53 of the vehicle body 51.

The connecting part 1 is, for example, formed in an oblong manner, such as in the manner of a rail, wherein on a longitudinal side 5 the bearing portion 2 is arranged.

The connecting part 1 is formed in order to be initially fastened to the vehicle body 51 and subsequently the bumper covering 100 (not shown in FIG. 2) be fixed thereon. In an embodiment, the connecting part 1 is fastened to the wall portion 58 and bears against the wall portion 60.

Figure 4:
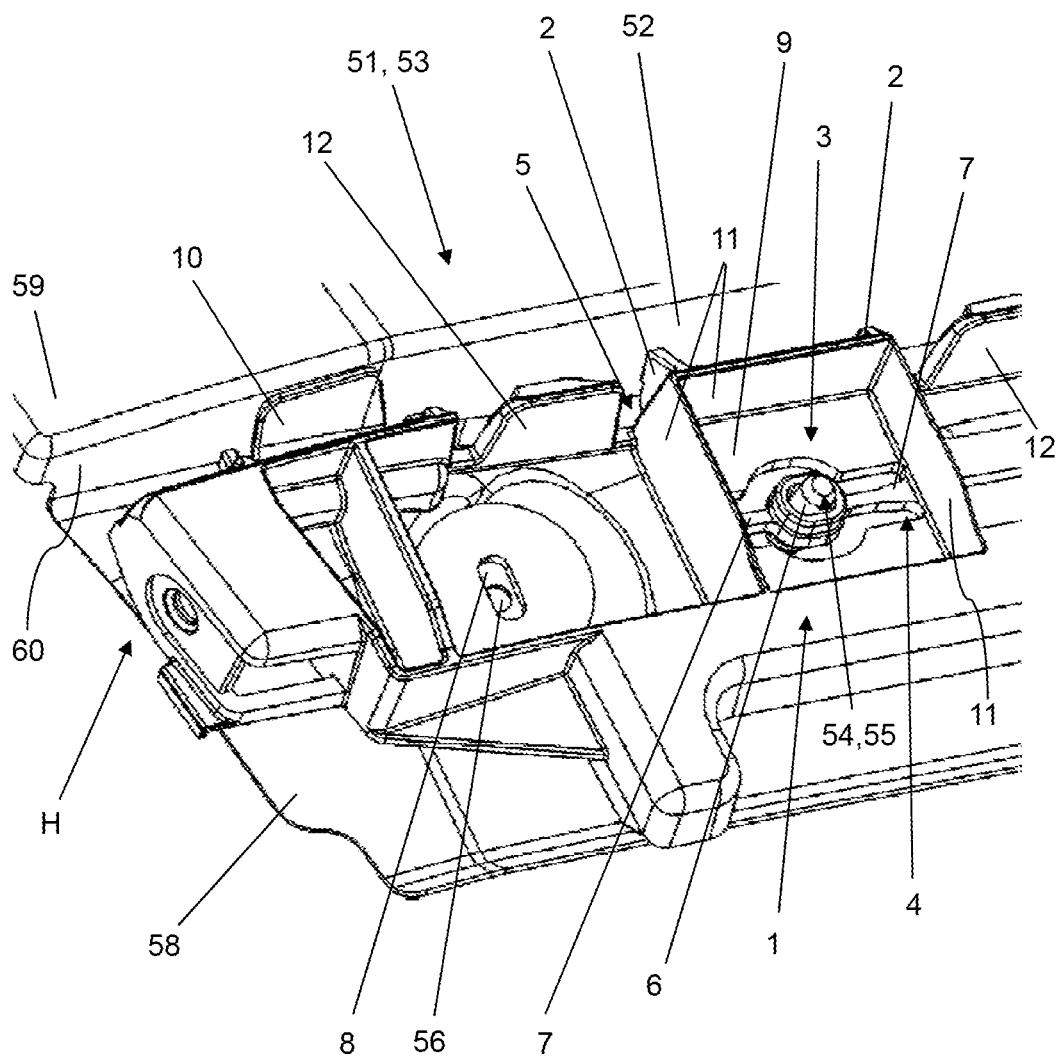
FIG. 4 is an enlarged detail view of the region of the vehicle body shown in FIG. 2 together with the connecting part.

By means of an enlarged detail from FIG. 2, FIG. 4 shows the side wall 53 and the connecting part 1. As is evident in particular from this and from FIG. 2, the connecting part 1 comprises a bearing portion 2, which can be brought to bear against a counterpart portion 52 of the side wall 53. The counterpart portion 52 of the side wall 53 is preferably formed by the wall portion 60.

Furthermore, the connecting part 1 comprises holding means 3, by which prior to the fastening of the connecting part to the side wall 53, the connecting part 1 can be brought into a holding position H on the side wall 53 subject to the bearing of the bearing portion 2 against the counterpart portion 52. In the FIGS. 2 and 4, the connecting part 1 is already brought into the holding position H with respect to the side wall 53.

The bearing portion 2 serves as spacer for the connecting part 1 with respect to the side wall 53 and with respect to the wall portion 60 of the side wall 53. To this end, the bearing portion 2 is substantially formed immovably with respect to the base body 9 of the connecting part 1. Preferably, the bearing portion 2 is arranged projecting from the base body 9 to the outside, wherein on the base body 9 at least one, for example a plurality of ribs 11 is provided, which serve for stiffening the connecting part 1 in the region of the bearing portion 2 and in the region of the holding means 3.

In order to hold the connecting part 1 in the holding position H, prior to and also while the connecting part 1 is fastened to the side wall 53, a spring element 4 is provided, through the force of which the connecting part 1 in the holding position H is pressed against the counterpart portion 52 of the side wall 53 with its bearing portion 2.

In an embodiment, the spring element 4 is formed by a spring-elastic material portion 7, on which the holding means 3 are arranged.

As is evident in particular from FIG. 3, in an embodiment the side wall 53 comprises means 53 in the region of the wall portion 58, which can be actively connected to the holding means 3 of the connecting part 1 in order to bring the connecting part 1 on the side wall 53 into the holding position H subject to the bearing of the bearing portion 2 against the counterpart portion 53 of the side wall 53 before the fastening of the connecting part 1 to the side wall 53.

In the embodiment according to FIGS. 2 to 4, the holding means 3 of the connecting part 1 are formed through a passage opening 6, in particular an elongated hole-shaped passage opening 6, wherein the passage opening 6 is provided, for example, at least in duplicate, as is evident in particular from FIG. 2. The means 54 formed on the side wall 53 are preferably formed through at least one protrusion 55 projecting to the outside, which for example can be formed as a pin element or bolt element, for example, a welding bolt. The protrusion 55 is preferably cylindrical and corresponds to the passage opening 6 of the connecting part 1 in order to be inserted into the passage opening 6 on the side wall 53 during the course of the assembly of the connecting part 1.

As is evident in particular from FIG. 4, the holding means 3 and the spring element 4 are arranged in the interior region of a side of the connecting part 1. To this end, the spring-elastic material portion 7 acting as spring element 4 is provided in duplicate, which is sunk into the base body 9 of the connecting part 1, for example, molded onto the latter, wherein about the material portion 7 the base body 9 is recessed.

The material portion 7 that is present in duplicate is connected to the base body 9 of the connecting part 1 on opposite sides each, wherein the material portions 7, preferably each in the manner of a web, extend towards each other and the material portions 7 at their ends facing each other merge into a freely-located frame 13, which forms the rim of the passage opening 6.

The spring-elastic material portions 7 substantially extend in the direction of the longitudinal side 5 of the connecting part 1, on which the at least one connecting part 2 is arranged, in particular, the material portions 7 substantially extend parallel to the longitudinal side 5. Because of this, an action of force of the material portion 7 is generated in the direction transversely to the longitudinal side 5.

In order to press the connecting part 1 in the holding position with its bearing portion 2 against the counterpart portion 52 of the side wall 53, the distance of the bearing portion 2 to the passage opening 6 is formed smaller than the distance of the protrusion 55 of the side wall 53 with respect to the wall portion 60 of the side wall 53, so that in the holding portion H the connecting part 1 bears against the counterpart portion 52 or the wall portion 60 of the side wall 53 with its bearing portion 2 subject to preload.

As is evident in particular from FIG. 4, an additional spring element 10 can be arranged on the connecting part 1, which for example is created to a strap projecting from the connecting part 1 to the outside in a resilient manner, in order to press against the wall portion 60 of the side wall 53. The additional spring element 10 serves as assembly 8. In order to ensure that in the holding position H the bearing portion 2 comes to bear against the counterpart portion 52 or the wall portion 60 and also remains there, the force of the additional spring element 10 with respect to the force of the spring element 4 is preferably smaller.

As is evident in particular from FIG. 4, the connecting part 1 comprises at least one passage opening 8 for receiving a connecting element (not shown in FIG. 4) in order to fasten the connecting part 1 to the side wall by means of the connecting element. The connecting element can for example be a riveting element, screwing element or the like.

Accordingly, in an embodiment the side wall 53 likewise comprises a passage opening 56, which is evident from the FIGS. 3 and 4.

In another embodiment, one of the two passage openings 8 and 56 is formed as an elongated hole, so that the passage openings 6 and 8 only have to have a relatively small position tolerance relative to each other in order to be able to plug through a connecting element with respect to the side wall 53 in the holding position H of the connecting part 1 in order to fasten the connecting part 1 to the side wall 53.

In a further embodiment, the passage opening 6 of the connecting part 1 is likewise formed as an elongated hole, the longitudinal axis of which substantially extends parallel to the longitudinal side 5 of the connecting part 1, so that in the holding position H the connecting part 1 can be slightly shifted to and fro with respect to the side wall 53 along the longitudinal extension of the wall portion 60 of the side wall 53.

Figure 5:
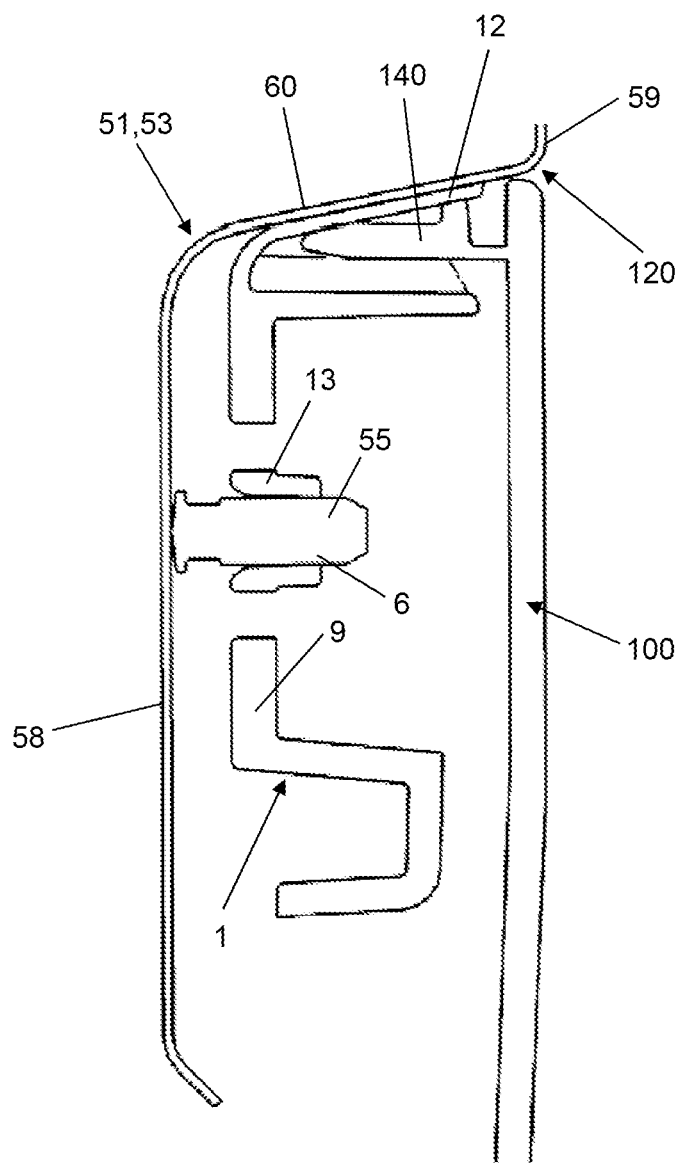
FIG. 5 is a sectional representation along the section line A-A according to FIG. 2 of the vehicle body in the connecting region with the bumper covering together with the connecting part.
Figure 6:
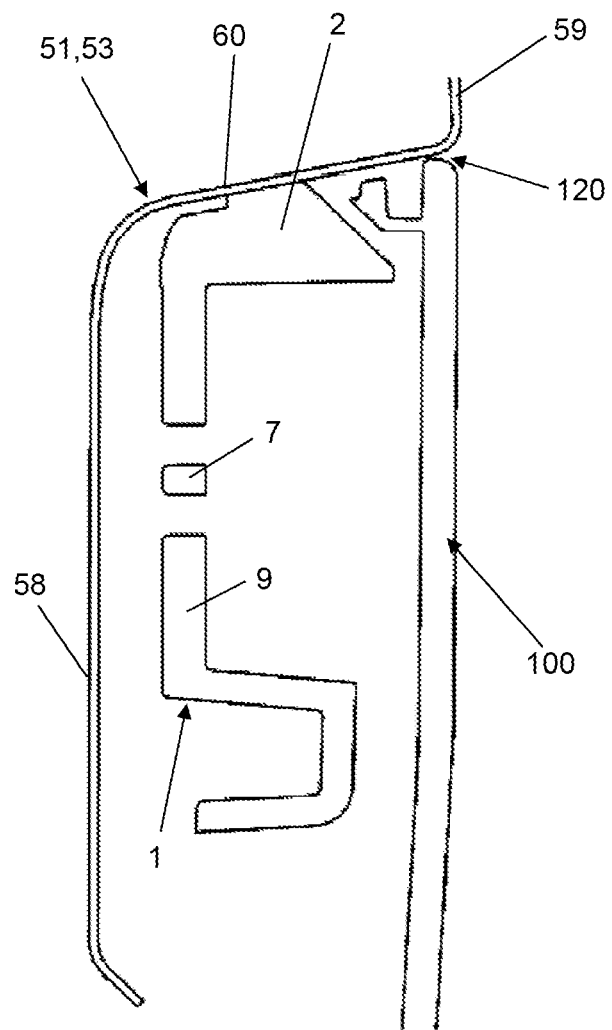
FIG. 6 is a sectional representation along the section line B-B according to FIG. 2 of the vehicle body in the connecting region with the bumper covering together with the connecting part.

FIG. 5 shows the side wall 53 and the connecting part 1 in sectional representation along the section line A-A according to FIG. 2. FIG. 6 shows the side wall 53 and the connecting part 1 in sectional representation along the section line B-B of FIG. 2.

FIG. 5 and FIG. 6 each show the bumper covering 100, which is fastened to the connecting part 1, for example by a clip portion 140, which is fixed with respect to a material portion 12 of the connecting part 1 acting as abutment. The joint 120, which has already been shown in FIG. 1, is additionally evident from the FIGS. 5 and 6.

The assembly of the bumper covering 100 to the vehicle body 51, in particular the side wall 53, is carried out in the following manner in accordance with an exemplary embodiment.

Initially, the connecting part 1 with its passage opening 6 is threaded in against the associated protrusion 56 of the side wall 53 against the spring force of the spring-elastic material portions 7, wherein in the threaded-in state the spring force presses the connecting part 1 with its bearing portion 2 against the counterpart portion 52 or the wall portion 60. In an embodiment, the connecting part 1 is placed as far as possible against the wall portion 58 by the assembler in the threaded state. The connecting part 1 is now present against the side wall 53 in the holding position, in which the connecting part 1 has a predetermined position with respect to the side wall 53 through the bearing portion 2 and is held in the holding position through the spring force of the spring-elastic material portions 7.

Following this, the connecting part 1 is fastened to the side wall 53 with at least one connecting element (not shown in the Figures). To this end, the respective connecting element is put through the passage opening 8 of the connecting part 1 and the passage opening 56 of the side wall 53 and the fastening of connecting part 1 and side wall 53 with respect to each other completed.

Following the fixing of the connecting part 1 to the side wall 53 by the connecting element, the bumper covering 100 is fastened to the connecting part 1.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

LIST OF REFERENCE CHARACTERS

1 Connecting part
2 Bearing portion
3 Holding means
4 Spring element
5 Longitudinal side
6 Passage opening
7 Spring-elastic material portion
8 Passage opening
9 Base body
10 Additional spring element
11 Ribs
12 Material portion, abutment
13 Frame
50 Motor vehicle
51 Vehicle body
52 Counterpart portion
53 Side wall
54 Means
55 Protrusion
56 Passage opening
57 Fender
58 Wall portion
59 Wall portion
60 Wall portion
100 Bumper covering
110 Bumper covering
120 Joint
130 Joint
140 Clip portion
H Holding position

The invention claimed is:

1. A connecting part for connecting a bumper covering to a vehicle body, wherein the connecting part is fastenable to the vehicle body and serves as holder for the bumper covering, the connecting part comprising:

a bearing portion that is at least partially brought to bear against a counterpart portion of the vehicle body, and holding means by which, prior to fastening of the connecting part to the vehicle body, the connecting part is brought into a holding position on the vehicle body subject to the bearing portion bearing against the counterpart portion, wherein the holding means are formed through at least one passage opening in which a protrusion of the vehicle body is engaged, wherein the bearing portion has an end that is brough to bear against the counterpart portion of the vehicle body, and wherein a first distance between the end of the bearing portion and the at least one passage opening is less than a second distance between the counterpart portion and the protrusion.

2. The connecting part according to claim 1, wherein the bearing portion serves as a spacer for the connecting part in a longitudinal direction with respect to an oblong surface of the vehicle body.

3. The connecting part according to claim 1, further comprising a spring element through the force of which the connecting part in a holding position is pressed against the counterpart portion of the vehicle body with the bearing portion.

4. The connecting part according to claim 3, wherein the holding means and the spring element are arranged in an inner region of a side of the connecting part.

5. The connecting part according to claim 3, wherein the spring element is formed through a spring-elastic material portion of the connecting part on which the holding means are arranged.

6. The connecting part according to claim 1, wherein the holding means in the holding position permit a limited movability of the connecting part relative to the vehicle body in at least one direction.

7. The connecting part according to claim 1, wherein the connecting part is formed in an elongated manner and is arranged on a longitudinal side of the bearing portion.

8. The connecting part according to claim 1, wherein the holding means are provided at least in duplicate and are located spaced from each other in a longitudinal direction of the connecting part.

9. The connecting part according to claim 1, wherein the connecting part is a plastic part.

10. The connecting part according to claim 9, wherein the connecting part is an injection molded plastic part.

11. The connecting part according to claim 1, wherein the connecting part comprises a side opening for receiving a connecting element coupled to a sidewall of the vehicle body in order to fasten the connecting part to the vehicle body.

12. The connecting part of claim 1, further comprising a spring element on the bearing portion pressed against the counterpart portion of the vehicle body in a holding position.

13. A vehicle body, to which a connecting part can be fastened, the connecting part comprising:

a bearing portion that is at least partially brought to bear against a counterpart portion of the vehicle body, and holding means by which, prior to fastening of the connecting part to the vehicle body, the connecting part is brought into a holding position on the vehicle body subject to the bearing portion bearing against the counterpart portion, and wherein the vehicle body comprises:

a portion against which the bearing portion of the connecting part is brought to bear, and means actively connectable to the holding means of the connecting part to bring the connecting part into a holding position on the vehicle body subject to the bearing of the bearing portion against the portion prior to a fastening of the connecting part to the vehicle body,
wherein the holding means are formed through at least one passage opening in which a protrusion of the vehicle body is engaged, wherein the bearing portion has an end that is brough to bear against the counterpart portion of the vehicle body, and wherein a first distance between the end of the bearing portion and the at least one passage opening is less than a second distance between the counterpart portion and the protrusion.

14. The vehicle body according to claim 12, wherein the means comprise protrusions projecting to an outside, which means are formed for engaging in the holding means formed as openings.

15. The vehicle body of claim 13, wherein the vehicle body is a side wall or fender of a motor vehicle.

16. A method for assembling a bumper covering to a vehicle body, the method comprising the steps of:
- providing a connecting part comprising:
  - a bearing portion, and
  - holding means,
- bringing, prior to coupling the bumper cover to the connecting part, the connecting part into a holding position on the vehicle body subject to a bearing of the bearing portion of the connecting part against a counterpart portion of the vehicle body, in that the holding means of the connecting part assume an active position with respect to the vehicle body;
- in the holding position, fastening the connecting part to the vehicle body by at least one fixing means, and
- fastening, after fastening the connecting part to the vehicle body, a bumper covering to the connecting part.

17. A system for fastening a bumper covering to a vehicle body, the system comprising:
- a connecting part comprising:
  - a bearing portion, and
  - holding means;
- a vehicle body comprising:
  - a counterpart portion against which the bearing portion of the connecting part is brought to bear, and
  - means actively connectable to the holding means of the connecting part to bring the connecting part into a holding position on the vehicle body subject to the bearing of the bearing portion against the counterpart portion prior to a fastening of the connecting part to the vehicle body, and
- a bumper covering connected to the connecting part,
- wherein the holding means are formed through at least one passage opening in which a protrusion of the vehicle body is engaged, wherein the bearing portion has an end that is brough to bear against the counterpart portion of the vehicle body, and wherein a first distance between the end of the bearing portion and the at least one passage opening is less than a second distance between the counterpart portion and the protrusion.

* * * * *